No. 667,531. Patented Feb. 5, 1901.
C. H. KAMMERER & H. KREIMEYER.
TRAP.
(Application filed June 18, 1900.)
(No Model.)
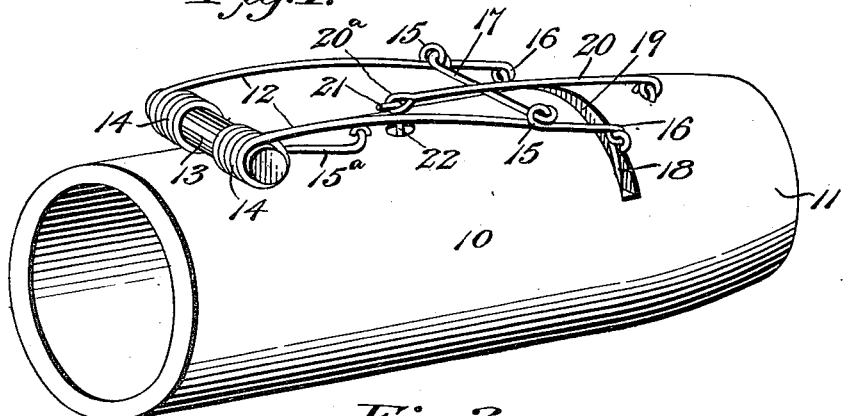
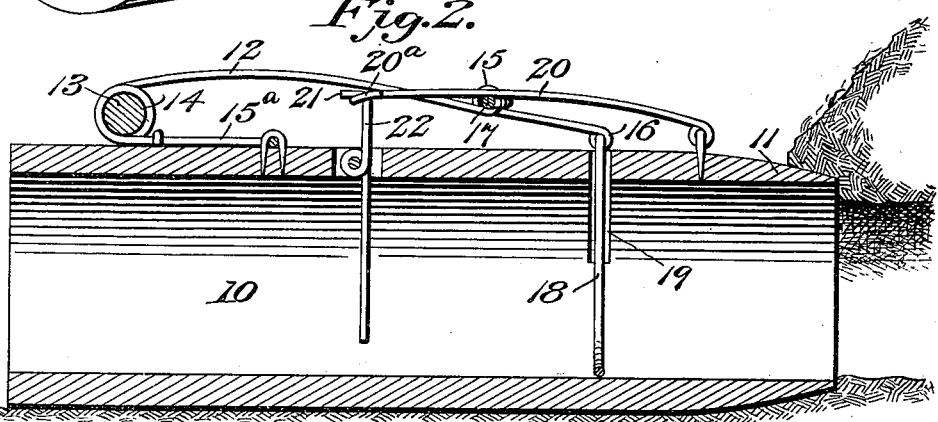
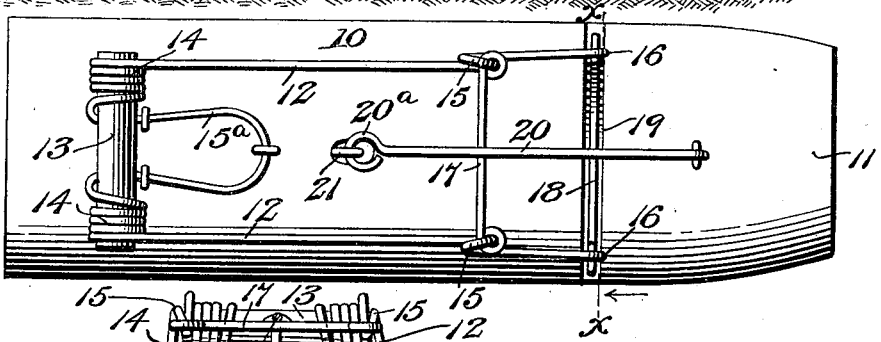
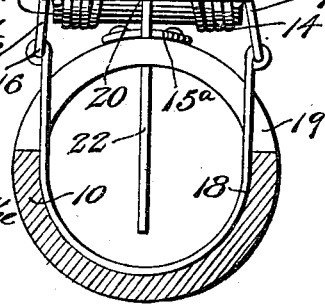
Charles H. Kammerer and
Henry Kreimeyer
Inventors
Witnesses
By
Attorney
THE NORRIS PETERS CO., PHOTO-LITHO., WASHINGTON, D. C.

UNITED STATES PATENT OFFICE.

CHARLES H. KAMMERER AND HENRY KREIMEYER, OF DESHLER, NEBRASKA.

TRAP.

SPECIFICATION forming part of Letters Patent No. 667,531, dated February 5, 1901.

Application filed June 18, 1900. Serial No. 20,752. (No model.)

*To all whom it may concern:*

Be it known that we, CHARLES H. KAMMERER and HENRY KREIMEYER, citizens of the United States, residing at Deshler, in the county of Thayer and State of Nebraska, have invented a new and useful Trap, of which the following is a specification.

This invention relates to animal-traps; and the object thereof is to provide an improved device of this character that is especially adapted for rats, mice, gophers, and other rodents.

The particular feature of the invention resides in the provision of a trap that may be inserted in the mouth of the animal's burrow, whereby the animal in attempting to leave the same must necessarily pass into the trap and be caught.

The special object is to provide a construction of trap in the form of a hollow plug arranged to be inserted in the mouth of an animal's burrow and having the mechanism thereof arranged entirely exterior to the casing, so as to have no obstruction other than the trigger in the passage-way, thus insuring perfect decoy of the animal.

In order that a complete understanding of the invention may be acquired, the preferred form thereof is shown in the accompanying drawings and described in the following specification, of which the drawings form a part.

In the drawings, Figure 1 is a perspective view of the preferred form of trap. Fig. 2 is a longitudinal section showing the same applied to an animal's burrow. Fig. 3 is a top plan view. Fig. 4 is a cross-section on the line *x x* of Fig. 3.

Similar numerals of reference designate like and corresponding parts in each of the figures of the drawings.

In carrying out the invention as shown in the drawings a tubular casing in the form of a hollow plug 10 is provided, upon the outer face of which is mounted the operating means for the choker-yoke, which is arranged to operate across the interior opening of the plug, as will be hereinafter described.

The plug 10 preferably comprises a cylindrical tube made of a single piece of wood or metal and open at both ends. The outer face of one end of the plug is beveled, as at 11, to form a contracted end, which may be readily inserted into the burrow of the animal which is to be caught. The diameter of the interior opening is, however, preferably the same throughout its entire length.

Mounted upon the exterior face of one side of the plug is the choker-operating mechanism. This comprises a pair of spring-actuated arms 12, which are preferably made of a single piece of spring-wire bent double to form the arms, each of which is coiled around the transversely-arranged rod 13, forming the springs 14. The bend of the wire forms a loop 15ᵃ, by means of which the spring-arms are secured to the outer face of the plug. The arms 12 are each provided intermediate their ends and also at their free ends with the loops 15 and 16, respectively. Through the intermediate loops 15 is passed the cross-bar 17, the ends of which are bent around said loops, whereby the two arms are connected. Loosely hung in the end loops 16 is the choker-yoke 18, which is arranged to pass through the slot 19 in the wall of the plug, the curved portion being adapted to rest against and conform to the interior contour of the plug directly opposite the slot 19, thus preserving a clear passage through the interior of the casing. In order to hold the yoke in operative position within the plug, the locking-rod 20 is provided, which is pivoted at one end to the plug and passes over the cross-bar 17. The free end of the locking-rod is provided with a loop 20ᵃ, which is engaged by the hooked end 21 of the locking-trigger 22. This trigger is pivoted in an opening in the plug and extends directly across the interior passage-way of the same.

In using the trap the loop is locked in set position and the beveled or contracted end is forced into the mouth of the animal's burrow. In this position the passage-way is entirely clear, with the exception of the locking-trigger. The animal in leaving the burrow must necessarily pass into the plug, which it will readily do, seeing the opposite end open. In the attempt to pass through it will press against the trigger, thereby releasing the spring-arms, which will draw the yoke toward the slot, and thereby catch and choke the animal. An animal on the outside, however, attempting to enter will not affect the mechanism, as the pressure against the trigger in the opposite direction will only force the hook into closer engagement with the locking-rod.

The trap may be made double, if desired—that is, it may be provided with a pair of oppositely-arranged choker-yokes and operating mechanism therefor, so that the animal will be caught whether it is entering or leaving its burrow, and it is to be understood that other changes in the size, proportion, and minor details of construction may be made without departing from the spirit or sacrificing any of the advantages of this invention.

Having thus described the invention, what we claim as new, and desire to secure by Letters Patent, is—

1. A trap, comprising a body in the form of a hollow plug open at both ends to provide a free passage-way therethrough which is closed upon all sides, said plug having one of its ends contracted to permit of its insertion into the mouth of an animal's burrow, a choker device extending within the passage-way and closely fitting and conforming to the shape of the inner wall thereof, operating mechanism for said device arranged wholly on the exterior of the casing, and a trigger for releasing said operating mechanism projecting into the passage-way and adapted to be operated by the attempted passage of an animal therethrough.

2. A trap, comprising a body in the form of a hollow plug open at both ends and forming an interior passage-way of substantially uniform size throughout which is inclosed on all sides, the outer walls of said plug at one end being contracted or beveled to permit of its insertion into the mouth of an animal's burrow, said plug being also provided with a transverse slot through its walls that opens into the interior passage-way, a pair of spring-arms arranged upon the exterior surface of said casing, a choker-yoke connected to the free ends of said arm and arranged to operate through said slot and across the passage-way, said yoke conforming substantially to the interior contour of the passage-way, and a locking-trigger for said arms pivoted upon the casing and projecting into the passage-way, said trigger being adapted to be operated to release the spring-arms by the attempted passage of an animal through the passage-way.

In testimony that we claim the foregoing as our own we have hereto affixed our signatures in the presence of two witnesses.

CHARLES H. KAMMERER.
HENRY KREIMEYER.

Witnesses:
FRED SCHMIDT,
JOHN S. WILKINSON.